United States Patent [19]

White

[11] 4,313,067
[45] Jan. 26, 1982

[54] SENSOR-INTEGRATOR SYSTEM

[75] Inventor: James A. White, Elkhart, Ind.

[73] Assignee: Miles Laboratories, Inc., Elkhart, Ind.

[21] Appl. No.: 57,883

[22] Filed: Jul. 16, 1979

[51] Int. Cl.³ .......................... G06G 7/12; H03K 5/00
[52] U.S. Cl. .................................. 307/494; 307/311; 328/127
[58] Field of Search ............... 307/311, 228, 229, 494; 328/127, 128; 250/213 R

[56] References Cited

U.S. PATENT DOCUMENTS 4,020,363  4/1977  Namata et al. ............... 328/127
4,165,471  8/1979  Ahrenkeil .................... 307/311

Primary Examiner—Stanley D. Miller, Jr.
Assistant Examiner—B. P. Davis
Attorney, Agent, or Firm—Roger N. Coe

[57] ABSTRACT

A sensor-integrator utilizes a light sensing diode directly connected to the inputs of an operational amplifier. The operational amplifier forms part of a dual-slope integrator and directly integrates the current generated by the light sensing diode thereby eliminating the need for preamplifiers and diode switching circuitry.

6 Claims, 3 Drawing Figures

SENSOR-INTEGRATOR SYSTEM

BACKGROUND OF THE INVENTION

1. Field of the Invention

This invention relates generally to light sensors, and more particularly to integrating light systems that provide an indication of the total amount of light sensed over a predetermined time interval.

2. Description of the Prior Art

Various light sensing systems, including integrating systems, are known; however, systems capable of operating at low light levels typically require preamplifiers between the light sensing device and the integrating amplifier. Such preamplifiers are disadvantageous in that they have offset and drift problems that must be compensated, thereby resulting in a fairly complex and expensive design. In addition, systems that use a dual-slope integrator for integrating the output of the sensor generally require switching circuitry for alternately connecting and disconnecting the sensor from the integrator. Such switching devices further add to the complexity of the system and cause further drift and voltage offset problems.

SUMMARY OF THE INVENTION

Accordingly, it is an object of the present invention to provide a sensor-integrator that overcomes many of the disadvantages of the prior art sensor-integrators.

It is another object of the present invention to provide a simplified sensor-integrator.

It is still another object of the present invention to provide a sensor-integrator using a dual-slope integrator that does not require switching circuitry for disconnecting the sensor from the dual-slope integrator.

It is yet another object of the present invention to provide a sensor-integrator system wherein the sensor is connected directly to the inputs of the integrator.

In accordance with a preferred embodiment of the invention, an operational amplifier is connected as a dual-slope integrator with a storage capacitor coupled between the output and the inverting input of the amplifier. The sensor which may be, for example, a light sensing semiconductor diode, is connected directly between the input terminals of the amplifier. A reference current source is connected to the inverting input and a switch is provided for selectively rendering the reference current source operative to apply the reference current to the inverting input. A timing circuit is provided for maintaining the reference current source inoperative for a predetermined first time interval. During this time interval, the storage capacitor is charged to a level proportional to the amount of current flowing through the sensor, and consequently, to a level proportional to the amount of light sensed by the sensor. After the predetermined first time interval has elapsed, the reference current source is rendered operative to apply the reference current to the operational amplifier in a direction opposite that of the current provided by the sensor to thereby discharge the storage capacitor. A comparator is provided again to disable the reference current source after the storage capacitor has been discharged to a predetermined level. The time required to discharge the storage capacitor to the predetermined level is a function of the integral of the current provided by the sensor over the first predetermined time interval.

BRIEF DESCRIPTION OF THE DRAWING

These and other objects and advantages of the present invention will become readily apparent upon consideration of the following detailed description and attached drawing, wherein.

DETAILED DESCRIPTION OF THE PREFERRED EMBODIMENT

Figure 1:
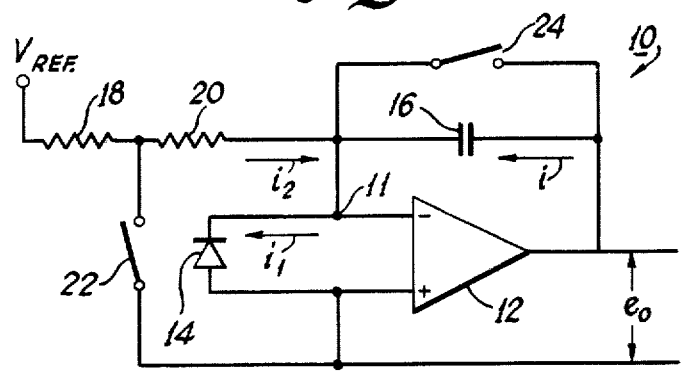
FIG. 1 is a simplified schematic diagram of the sensor-integrator according to the invention.

Referring now to the drawing, with particular attention to FIG. 1, there is shown a simplified diagram of the sensor-integrator 10. The sensor-integrator 10 comprises an operational amplifier 12 having inverting and noninverting input terminals. A sensor such as a photodiode 14 is connected, in the present embodiment, directly across the input terminals of the amplifier 12, however, any passive direct current coupling network, such as, for example, a resistive or inductive network, can be used. A capacitor 16 is connected between the output and the inverting input of the operational amplifier 12 and stores a charge proportional to the amount of current flowing through node 11. A pair of resistors 18 and 20 connected to a voltage reference provide a source of reference current for the integrator 10. A switch 22 selectively shunts the reference current flowing through the resistor 18 to ground and away from the amplifier 12, while a second switch 24 is used to discharge the capacitor 16.

In operation, the switch 22 is first closed to shunt the reference current away from the inputs of the amplifier 12. The switch 24 is momentarily closed to discharge the capacitor 16. After the switch 24 is opened, the input current at node 11 is solely the current generated by the photodiode 14. Since the input voltage at the inverting inputs of amplifier 12 is essentially zero potential, because the feedback mechanism of the integrator, the diode load is a low impedance, and for all practical purposes a short circuit. The diode 14 thus acts as a current generator that provides a current proportional to light intensity. This current will be referred to as $i_1$. The direction of the current $i_1$ is shown in FIG. 1, with the flow of conventional current being from the inverting input of the amplifier 12 through the diode 14 and into the noninverting input of the amplifier 12. Because resistor 20 is connected to essentially a zero potential source at each termination, the resistor 20 provides virtually no shunting of the diode generated current. Thus, with the switch 22 closed, the shunting effect of the resistor 20 is negligible. Also, with the switch 22 closed, the reference current $i_2$ is zero.

Figure 2:
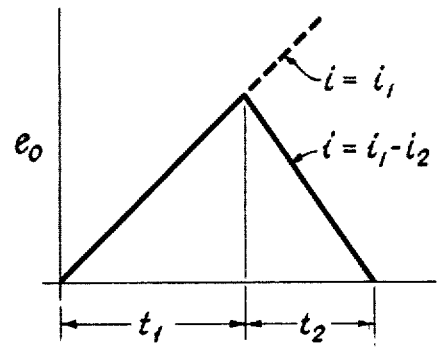
FIG. 2 is a graph illustrating the operation of the sensor-integrator according to the invention.

The current $i_1$ flows through the capacitor 16 in the direction shown in FIG. 1. This current causes the capacitor 16 to charge and gradually increases the output voltage $e_o$ as shown in FIG. 2. Thus, the voltage $e_o$ increases at a rate determined by the current $i_1$. The switch 22 is maintained closed for a predetermined time interval $t_1$ at which point the switch 22 is opened. When the switch 22 is opened, the current $i_2$ increases from a zero value to a reference value greater than the value of the current $i_1$. When this occurs, the current i through the capacitor 16 becomes equal to the difference between the currents $i_1$ and $i_2$ since the direction of the current $i_2$ is opposite that of the current $i_1$. Since, as previously stated, the value of the current $i_2$ is greater than the value of the current $i_1$, the direction of the net current i flowing through the capacitor 16 becomes opposite to the direction shown in FIG. 1, and the voltage $e_o$ decreases at a rate determined by the value of the reference current $i_2$ minus $i_1$. Alternatively, the sensor current $i_1$ can be made a known value by illuminating the diode 14 with a light source of known intensity, or by maintaning the diode 14 in total darkness.

After the switch 22 has been opened, the voltage $e_o$ will continue to drop at a rate determined by the reference current $i_2$ minus $i_1$. The switch 22 is maintained open until the output voltage $e_o$ reaches a predetermined level, such as, for example, zero volts, and the time $t_2$ elapsed between the opening of the switch 22 and the value of the output voltage $e_o$ reaching the aforesaid predetermined level is ascertained. Since the value of the output voltage $e_o$ at the end of the time interval $t_1$ is determined by the magnitude of the sensor current $i_1$, and since the magnitude of the reference voltage $i_2$ is known, the value of the sensor current $i_1$ can be readily ascertained by comparing the time intervals $t_1$ and $t_2$ in conventional dual-slope integrator fashion.

Figure 3:
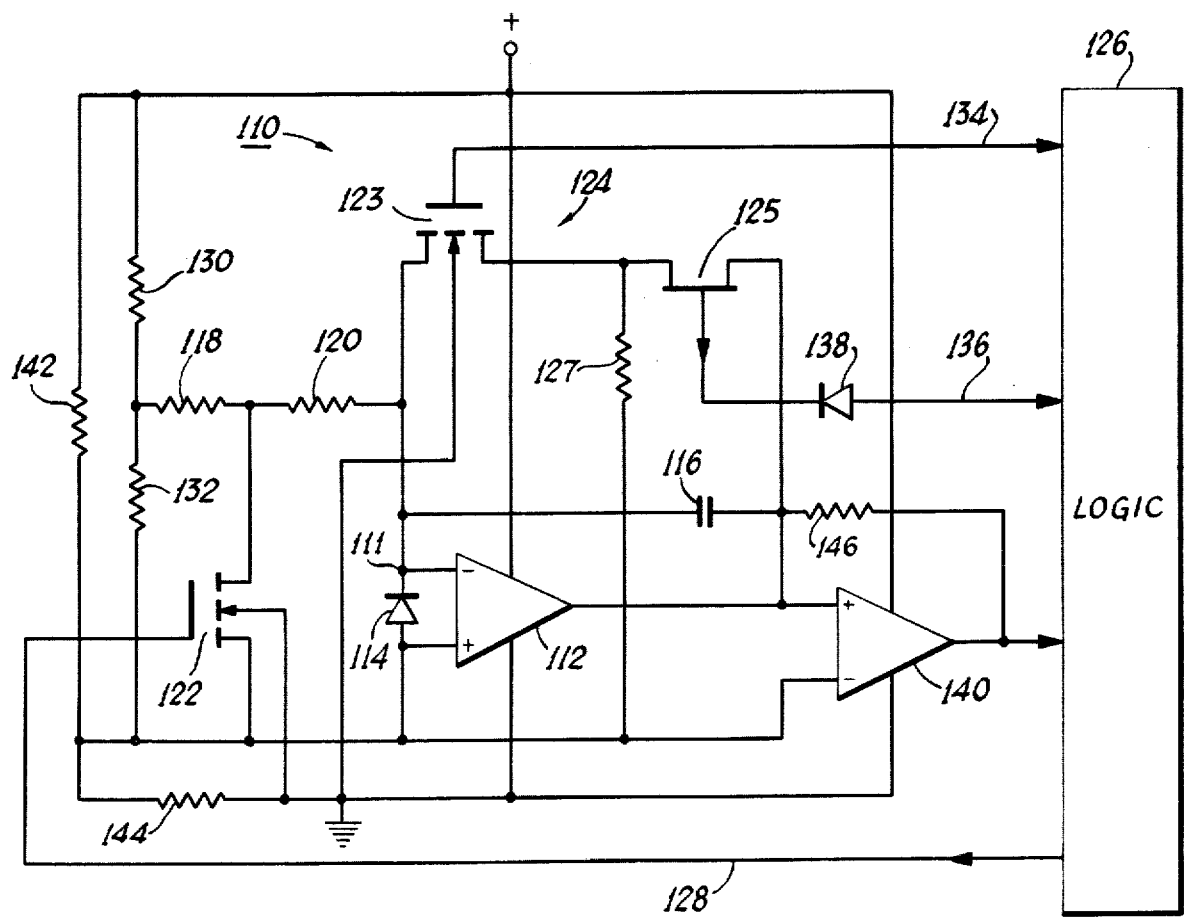
FIG. 3 is a schematic diagram of a practical embodiment of the sensor-integrator according to the invention.

A practical embodiment of the sensor-integrator according to the invention is illustrated in FIG. 3. The embodiment illustrated in FIG. 3 utilizes hundreds series reference numerals to identify various components, with analogous components of the embodiments of FIGS. 1 and 3 having like tens and units digits. Thus, the amplifier 112, for example, corresponds to the amplifier 12 of FIG. 1.

In the embodiment illustrated in FIG. 3, the amplifier 112, the diode 114, the capacitor 116 and the resistors 118 and 120 correspond to the like components 12, 14, 16, 18 and 20 of FIG. 1. In addition, a field effect transistor 122 is used as the switch 22, and a pair of field effect transistors 123 and 125 are connected in series to form a switching circuit 124 analogous to the switch 24. Two field effect transistors are used as the switching circuit 124 to reduce the leakage current across the capacitor 116, and a resistor 127 at the junction of the transistors 123 and 125 serves as a current limiting resistor. In the embodiment shown, the field effect transistors 122 and 123 are N-channel enhancement mode insulated gate field effect transistors (IGFETS) and the field effect transistor 125 is a P-channel junction transistor (J-FET), however, any suitable switching transistors may be used.

In the embodiment illustrated in FIG. 3, the operation of the circuit is controlled by a logic circuit 126 which contains timing, computation and switching circuitry. In operation, the logic circuit 126 applies a signal via a line 128 to the gate of the field effect transistor 122 to thereby render the field effect transistor 122 conductive. This causes the transistor 122 to conduct to ground the current flowing through the resistor 118 as a result of the potential at the junction of a pair of resistors 130 and 132. Simultaneously, the field effect transistors 123 and 125 are momentarily rendered conductive via signals applied to the gates thereof via a pair of lines 134 and 136. The signal on line 136 is applied to the transistor 125 via a reverse polarity protection diode 138. The momentary rendering conductive of the transistors 123 and 125 discharges the capacitor 116 to initialize the integrating operation.

The transistor 122 is maintained conductive for the predetermined time interval $t_1$ during which time the capacitor 116 is charged to a value proportional to the current generated by the photodiode 114, which current is proportional to the intensity of the light to which the photodiode 114 is exposed. After the time interval $t_1$, the logic circuit 126 initiates a timing sequence and renders the transistor 122 nonconductive. When the transistor 122 is rendered nonconductive, current flows fron the junction of the resistors 130 and 132 through the resistors 118 and 120 and into node 111 of the amplifier 112. This current reverses the polarity of the output current and causes the gradual discharge of the capacitor 116 and the corresponding decrease in the voltage at the output of the amplifier 112.

The output of the amplifier 112 is monitored by a comparator 140 which compares the voltage at the output of the amplifier 112 with a bias voltage appearing at the junction of a pair of resistors 142 and 144, and provides a signal to the logic circuit 126 when the voltage at the output of the amplifier 116 drops below the voltage at the junction of the resistors 142 and 144 to thereby terminate the timing sequence. A resistor 146 connected between the comparator 140 and the junction of the input of the comparator 140, the capacitor 116 and the transistor 125 provides hysteresis for the comparator 140. The elapsed time $t_2$ between the rendering nonconductive of the transistor 122 and the generation of the logic signal by the comparator 140 is then compared with the predetermined time interval $t_1$ in order to determine the current generated by the photodiode 114 during the interval $t_1$.

In the two embodiments illustrated in FIGS. 1 and 3, the source of reference current has been a voltage source and a pair of limiting resistors. However, the reference current source can be obtained from various current sources including a second photodiode that is exposed to a light source which would produce a current greater than the maximum current produced by the diode 14. Such an arrangement would provide compensation for variations in the light source and compensate for variations in the parameters of the photodiode 14.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A sensor-integrator comprising:
   an amplifier having an inverting input terminal, a noninverting input terminal and an output terminal;
   a light sensing device that provides a current which varies in accordance with the intensity of light energy applied to said device, said light sensing device having first and second terminals;
   passive circuit means for direct current coupling said first and second terminals to said input terminals;
   a reference current source coupled to one of said inputs and switching means coupled to said reference current source for selectively rendering said reference current source operative to supply a predetermined reference current to one of said inputs; and
   charge storage means coupling said output terminal and said inverting input terminal and cooperating with said amplifier for providing at said output terminal an output voltage proportional to the total current applied to said input terminals over a predetermined time interval.

2. A sensor-integrator as recited in claim 1 further including means coupled to said switching means for rendering said reference current source inoperative to supply said predetermined reference current to said one of said inputs for a predetermined time interval and for rendering said reference current source operative to supply said predetermined reference current at the end of said predetermined time interval.

3. A sensor-integrator as recited in claim 2 further including level sensing means coupled to said output for sensing the amplitude of the voltage present at said output terminal and providing a switching signal when said voltage reaches a predetermined level, and means responsive to said switching signal for rendering said switching means operative to discontinue supplying said predetermined reference current to said one of said inputs.

4. A sensor-integrator as recited in claim 3 further including means for determining the elapsed time interval between the end of said predetermined time interval and the occurrence of said switching signal and means for comparing said predetermined time interval and said elapsed time interval to thereby provide an indication of the total current applied to said inputs over said predetermined time interval.

5. A sensor-integrator as recited in claim 1 wherein said passive circuit means includes means for directly connecting said light sensing device to said input terminals.

6. A sensor-integrator as recited in claim 5 wherein said light sensing device is a photodiode.

* * * * *